US007845486B2

(12) United States Patent
Spencer et al.

(10) Patent No.: US 7,845,486 B2
(45) Date of Patent: Dec. 7, 2010

(54) CONVEYOR APPARATUS

(75) Inventors: Mark W. Spencer, Oshkosh, WI (US); Nathan Grams, Omro, WI (US); Randel L. Radandt, Oshkosh, WI (US); Patris E. Vincent, Neenah, WI (US)

(73) Assignee: Arrowhead Conveyor Corporation, Inc., Oshkosh, WI (US)

( * ) Notice: Subject to any disclaimer, the term of this patent is extended or adjusted under 35 U.S.C. 154(b) by 779 days.

(21) Appl. No.: 11/762,633

(22) Filed: Jun. 13, 2007
(Under 37 CFR 1.47)

(65) Prior Publication Data
US 2008/0035452 A1 Feb. 14, 2008

Related U.S. Application Data

(60) Provisional application No. 60/812,897, filed on Jun. 13, 2006, provisional application No. 60/853,060, filed on Oct. 20, 2006.

(51) Int. Cl.
*B65G 47/26* (2006.01)
(52) U.S. Cl. .................. 198/442; 198/427; 198/429; 198/588
(58) Field of Classification Search .............. 198/367, 198/418.2, 427, 429, 442, 588, 890
See application file for complete search history.

(56) References Cited

U.S. PATENT DOCUMENTS

| 3,193,078 A * | 7/1965 | Amenta et al. ............ 198/419.1 |
| 3,580,640 A * | 5/1971 | Eriksson ...................... 406/19 |
| 3,999,648 A | 12/1976 | Kennedy |
| 4,003,465 A | 1/1977 | Bauer |
| 4,039,073 A | 8/1977 | Ohlhaver |
| 4,147,248 A | 4/1979 | Kurczak et al. |
| 4,265,356 A * | 5/1981 | Glover ...................... 198/444 |
| 4,333,297 A | 6/1982 | Kuttenbaum et al. |
| 4,369,873 A | 1/1983 | Heuft |
| 4,550,820 A | 11/1985 | Bishop |
| 4,616,745 A | 10/1986 | Hartness |
| 4,723,649 A * | 2/1988 | Hartness et al. ............. 198/442 |
| 4,771,876 A | 9/1988 | Bandixen |
| 4,830,173 A | 5/1989 | Hartness et al. |
| 4,874,079 A | 10/1989 | Frenkel et al. |
| 4,889,223 A * | 12/1989 | Bergstrom .................. 198/364 |
| 5,042,636 A | 8/1991 | Underwood |
| 5,101,959 A | 4/1992 | Whitby |
| 5,174,430 A | 12/1992 | Ebira |

(Continued)

OTHER PUBLICATIONS

AMBEC product information for Cobra Laning System as shown on www.ambec.com dated Apr. 11, 2006.

(Continued)

*Primary Examiner*—Douglas A Hess
(74) *Attorney, Agent, or Firm*—Boyle Fredrickson, S.C.

(57) ABSTRACT

A conveyor apparatus for diverting product from a single lane to one of a plurality of lanes includes a wall having an upstream portion positioned proximate the single lane and a downstream portion positioned proximate the plurality of lanes. The upstream portion is stationary relative to the single lane and the downstream portion is configured to be movable relative to the plurality of lanes. A length of the wall is configured to vary in response to movement of the downstream portion.

27 Claims, 11 Drawing Sheets

U.S. PATENT DOCUMENTS

| | | | |
|---|---|---|---|
| 5,282,525 A | 2/1994 | Covert | |
| 5,423,409 A | 6/1995 | Wipf | |
| 5,441,142 A * | 8/1995 | Schneider | 198/442 |
| 5,518,102 A | 5/1996 | Hershline | |
| 5,638,938 A | 6/1997 | Lazzarotti et al. | |
| 5,716,189 A | 2/1998 | Winski et al. | |
| 5,746,572 A | 5/1998 | Winski | |
| 5,762,794 A | 6/1998 | Simkowski et al. | |
| 5,787,679 A | 8/1998 | Lynch et al. | |
| 5,788,052 A | 8/1998 | Spatafora | |
| 5,819,907 A | 10/1998 | Simkowski | |
| 5,842,818 A | 12/1998 | Simkowski | |
| 5,944,165 A * | 8/1999 | Mannlein et al. | 198/442 |
| 5,961,275 A | 10/1999 | Winski et al. | |
| 5,988,356 A | 11/1999 | Bonnet | |
| 6,044,956 A | 4/2000 | Henson et al. | |
| 6,058,601 A | 5/2000 | DeKoning | |
| 6,068,105 A | 5/2000 | Darwish et al. | |
| 6,139,240 A | 10/2000 | Ando | |
| 6,189,702 B1 | 2/2001 | Bonnet | |
| 6,253,905 B1 | 7/2001 | Pelka | |
| 6,257,805 B1 | 7/2001 | Bernard | |
| 6,264,042 B1 | 7/2001 | Cossey, Jr. et al. | |
| 6,334,525 B1 | 1/2002 | Collins et al. | |
| 6,374,992 B1 * | 4/2002 | Simkowski | 198/626.1 |
| 6,401,904 B1 | 6/2002 | Risley | |
| 6,513,642 B1 | 2/2003 | Shearer, Jr. et al. | |
| 6,516,933 B1 | 2/2003 | Ledingham | |
| 6,691,858 B2 | 2/2004 | Weber | |
| 6,705,452 B2 | 3/2004 | Greve et al. | |
| 6,772,872 B2 * | 8/2004 | Spangenberg et al. | 198/442 |
| 6,854,586 B1 * | 2/2005 | VanderMeer et al. | 198/436 |
| 6,910,568 B1 | 6/2005 | Ydoate et al. | |
| 6,923,308 B2 | 8/2005 | Veit | |
| 7,086,519 B2 | 8/2006 | Veit et al. | |
| 7,086,521 B1 | 8/2006 | Pearce et al. | |
| 7,392,891 B2 * | 7/2008 | Kinoshita et al. | 192/70.14 |
| 7,658,274 B2 * | 2/2010 | Mignano | 198/442 |

OTHER PUBLICATIONS

Hartness International information for Hartness Syncro Laner Model 2260 as shown on www.hartness.com dated Apr. 11, 2006.

* cited by examiner

CONVEYOR APPARATUS

CROSS-REFERENCE TO RELATED APPLICATIONS

This application claims priority to U.S. Provisional Patent Application No. 60/812,897, entitled "Conveyor Apparatus", filed Jun. 13, 2006 by Mark W. Spencer and to U.S. Provisional Patent Application No. 60/853,060, entitled "Conveyor Apparatus", filed Oct. 20, 2006 by Mark W. Spencer and Nathan Grams, the entire contents of both of which are hereby incorporated by reference.

BACKGROUND

The present invention relates to a conveyor apparatus, and in particular a laner for diverting articles along a conveyor path from a single conveyor to one of a plurality of downstream lanes.

Diverters are used in product processing or conveying systems to divide a single file flow of products into multiple rows, or lanes, of products. Some diverters divide product flow into multiple lanes without stopping or slowing down the product flow rate along an infeed path; however, such diverters do not maintain product stability during lane changes, make lane changes while stopping product flow or allowing products to move out of lane limits (i.e., directing products to between lane points along the flow path), and require complicated electro-mechanical devices to accomplish lane changes. These diverters decrease product flow through the conveying system and result in product contact, damage, and jams during lane changes.

SUMMARY

In one embodiment, the invention provides a conveyor apparatus for diverting product from a single lane to one of a plurality of lanes. The conveyor apparatus includes a wall having an upstream portion positioned proximate the single lane and a downstream portion positioned proximate the plurality of lanes. The upstream portion is stationary relative to the single lane and the downstream portion is configured to be movable relative to the plurality of lanes. A length of the wall is configured to vary in response to movement of the downstream portion.

In another embodiment, the invention provides a conveyor apparatus for diverting product from a single lane to one of a plurality of lanes, whereby the product in the single lane is moving on a conveyor along a travel path. The conveyor apparatus includes a wall provided above the conveyor. The wall has an upstream portion and a downstream portion. The downstream portion is configured to be movable in a direction substantially parallel to the travel path and is configured to be selectively movable in a non-parallel direction to the travel path in order to selectively direct the product to one of the plurality of lanes. While the wall is moving relative to the travel path, the wall is configured to selectively vary a wall length between the upstream portion and the downstream portion.

In yet another embodiment, the conveyor apparatus includes a wall having an upstream portion positioned proximate the single lane and a downstream portion positioned proximate the plurality of lanes. The wall is configured to direct the product from the single lane toward the plurality of lanes. The conveyor apparatus also includes a carriage system configured to move relative to the plurality of lanes in a first direction and in a second direction non-parallel to the first direction. The downstream portion of the wall is coupled to the carriage system for movement therewith. The carriage system moves the downstream portion of the wall adjacent to one of the plurality of lanes to direct the product toward the one of the plurality of lanes. The conveyor apparatus also includes a take-up system coupled to the wall and configured to take-up and release a portion of the wall in response to movement of the downstream portion of the wall.

In still another embodiment, the conveyor apparatus includes a first wall having a first upstream portion positioned proximate the single lane and a first downstream portion positioned proximate the plurality of lanes. The conveyor apparatus also includes a second wall generally parallel to the first wall and defining a channel therebetween. The second wall has a second upstream portion positioned proximate the single lane and a second downstream portion positioned proximate the plurality of lanes. The first and second upstream portions are stationary relative to the single lane, and the first and second downstream portions are movable relative to the plurality of lanes. A length of each of the first and second walls is configured to vary in response to movement of the first and second downstream portions. The conveyor apparatus further includes a carriage system having a yoke configured to be movable relative to the plurality of lanes in a first direction and a second direction non-parallel to the first direction. The first downstream portion and the second downstream portion are coupled to the yoke for movement therewith.

Other aspects of the invention will become apparent by consideration of the description below and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The present invention relates to a conveyor apparatus 10, or laner or diverter system, used in a product processing or conveying system 14 to divide a single file product flow into multiple rows, or lanes, of products. The conveying system 14 includes an infeed conveyor 18 defining an upstream flow path and an outfeed conveyor 22 formed by a plurality of lanes 22A, 22B, 22C, each defining a downstream flow path. Each lane 22A, 22B, 22C feeds one or more downstream channels 26A, 26B, 26C, each of which is defined by the outfeed conveyor lanes 22A, 22B, 22C and dividers 30. In the illustrated embodiments, three lanes are shown although it should be readily apparent to those of skill in the art that fewer or more lanes may be used.

The diverter system 10 is used to divide product flow from the infeed conveyor 18 to one of the lanes 22A, 22B, 22C without stopping or slowing down product flow rate along the infeed conveyor 18. The diverter system 10 also maintains stability of product and keeps product within lane limits during lane changes. Therefore, the diverter system 10 allows for increased process flows through the conveying system 14, and reduces or eliminates product contact and damage during lane changes.

Figure 1:
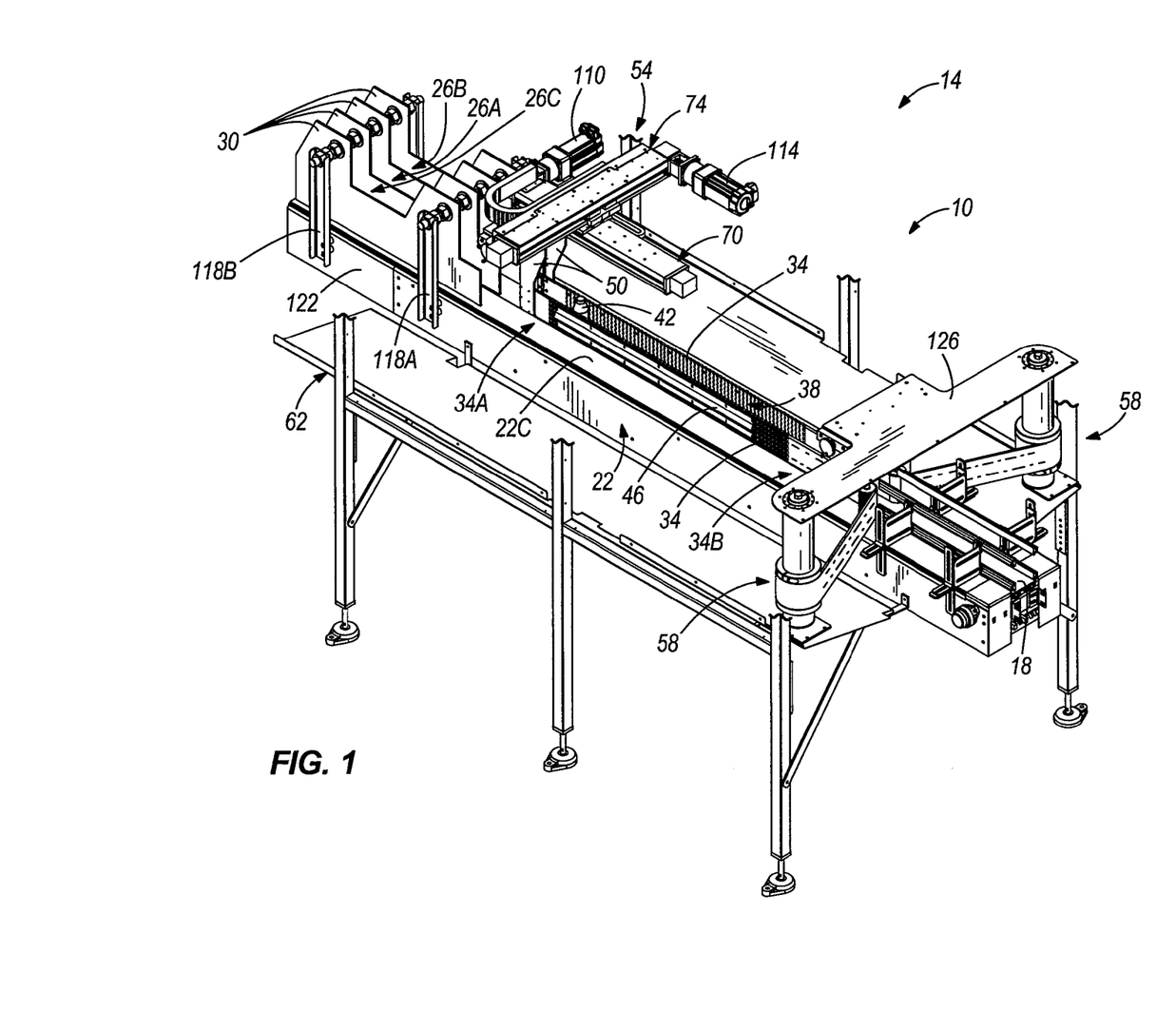
FIG. 1 is a perspective view of a conveyor apparatus according to one embodiment of the invention, wherein the conveyor apparatus includes a carriage system and take-up systems.
Figure 2:
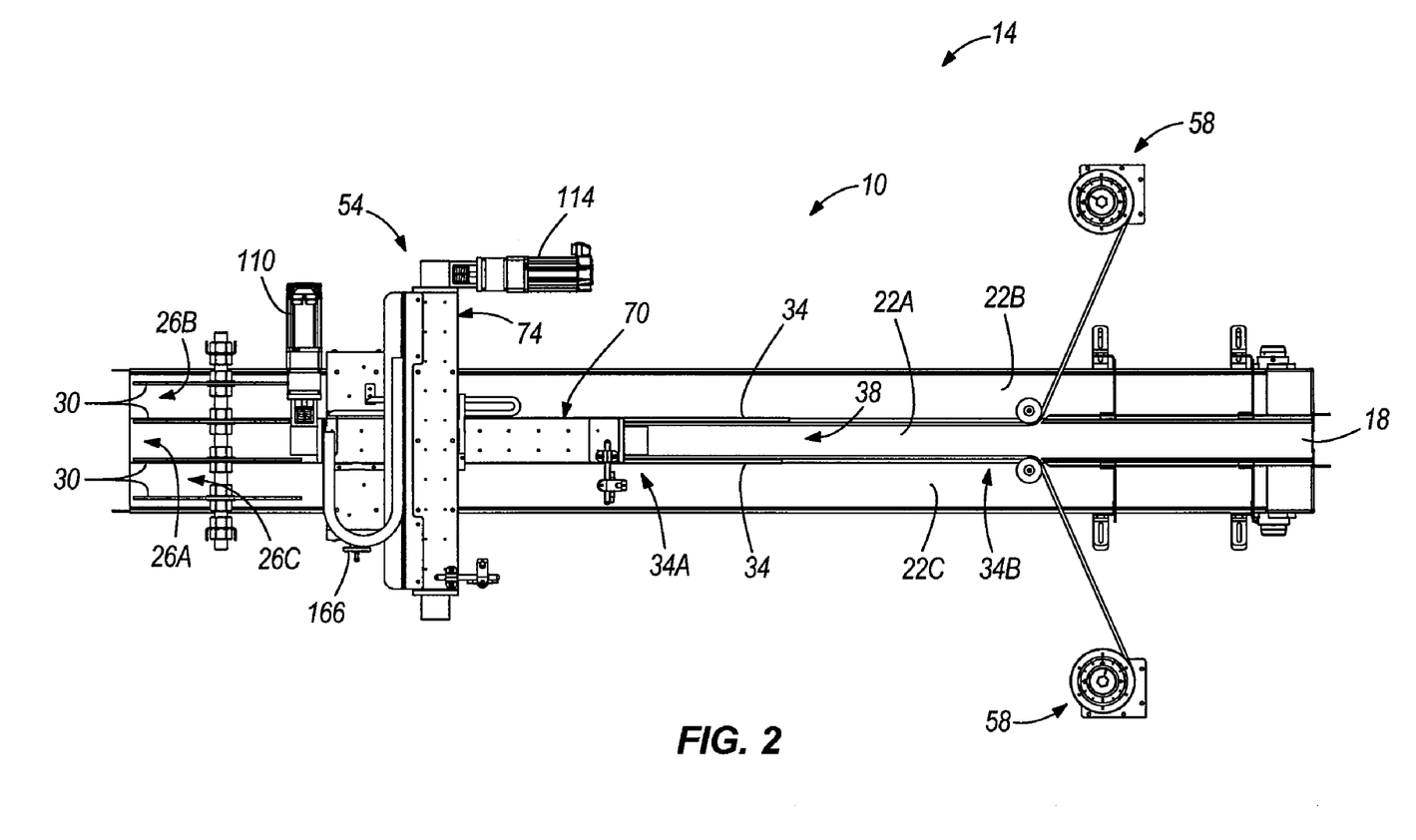
FIG. 2 is a top view of the conveyor apparatus shown in FIG. 1.

FIGS. 1 and 2 illustrate one embodiment of the diverter system 10 used in the conveying system 14. The infeed conveyor 18 is formed by a conveyor having a movable carrying surface, and the outfeed conveyor 22 and the lanes 22A, 22B, 22C are formed by a series of side-by-side conveyors. Examples of the types of conveyors used in the diverter system 10 include a chain, a belt, or other known conveyors. In the illustrated embodiment, the outfeed conveyor 22 and the lanes 22A, 22B, 22C are formed by three separate side-by-side chains, generally referred to as table top chains. In another embodiment, a single wide chain may be used, generally referred to as mat top chain.

The diverter system 10 includes a pair of guide walls 34 that extend a length of the outfeed conveyor 22. The guide walls 34 are spaced apart to define a channel 38 through which conveyed articles 42, or product, pass. In the illustrated embodiment, each guide wall 34 is formed of modular plastic belting and includes a stainless steel backing plate 46 to provide additional support to the guide wall 34. It should be readily apparent to those of skill in the art that in a further embodiment, the guide wall 34 may be formed from a bead rail, a flexible rail, a driven rail belt, a gripper-type chain, soft textured belting, a belt with a band of memory foam attached thereto, or another known material for stabilizing conveyed product. In an embodiment with a driven rail belt, speed of the rail belt may be varied with respect to the speed of the outfeed lanes. Each guide wall 34 includes a downstream portion 34A coupled to a yoke member 50 extending from a carriage system 54 of the diverter system 10 and an upstream portion 34B coupled to a coil assembly 58. A portion of the wall 34 is selectively taken up by and fed out from the coil assembly 58 to shorten and lengthen an exposed portion of the wall 34, and thereby, the channel 38.

The carriage system 54 selectively moves a portion of the guide walls 34 proximate the downstream portion 34A across the outfeed conveyor 22 and the lanes 22A, 22B, 22C to divert products from the first lane 22A, which is aligned with the infeed conveyor 18, to the second lane 22B or the third lane 22C. The carriage system 54 also selectively moves the guide walls 34 along the outfeed conveyor 22. Thus, the walls 34 effectively move in a diagonal direction to divert articles to the selected lane. A length of the walls 34 is released by the respective coil assembly 58 as the downstream portion 34A moves away from the infeed conveyor 18 to extend the walls 34 and the channel 38. Likewise, a length of the walls 34 is taken up by the respective coil assembly 58 as the downstream portion 34A moves toward the infeed conveyor 18 to shorten the walls 34 and the channel 38.

Movement of the walls 34 is coordinated by a controller (not shown), such as a PLC, and product quantity sensors (not shown) positioned downstream of the infeed conveyor 18. In the illustrated embodiments the guide walls 34 are moved and positioned at the downstream portion 34A by a linear servo slide assembly of the carriage system 54. In further embodiments, other known actuator assemblies may be used, such as a pneumatic cylinder (with preset stop positions or position feedback capability), a linear actuator, a gear rack assembly, or the like. The product quantity sensors may be a photo eye or photocell, a sonic sensor, a vision sensor, a photoelectric sensor, an encoder, a proximity sensor, or any other known position quantity sensor.

Figure 3A:
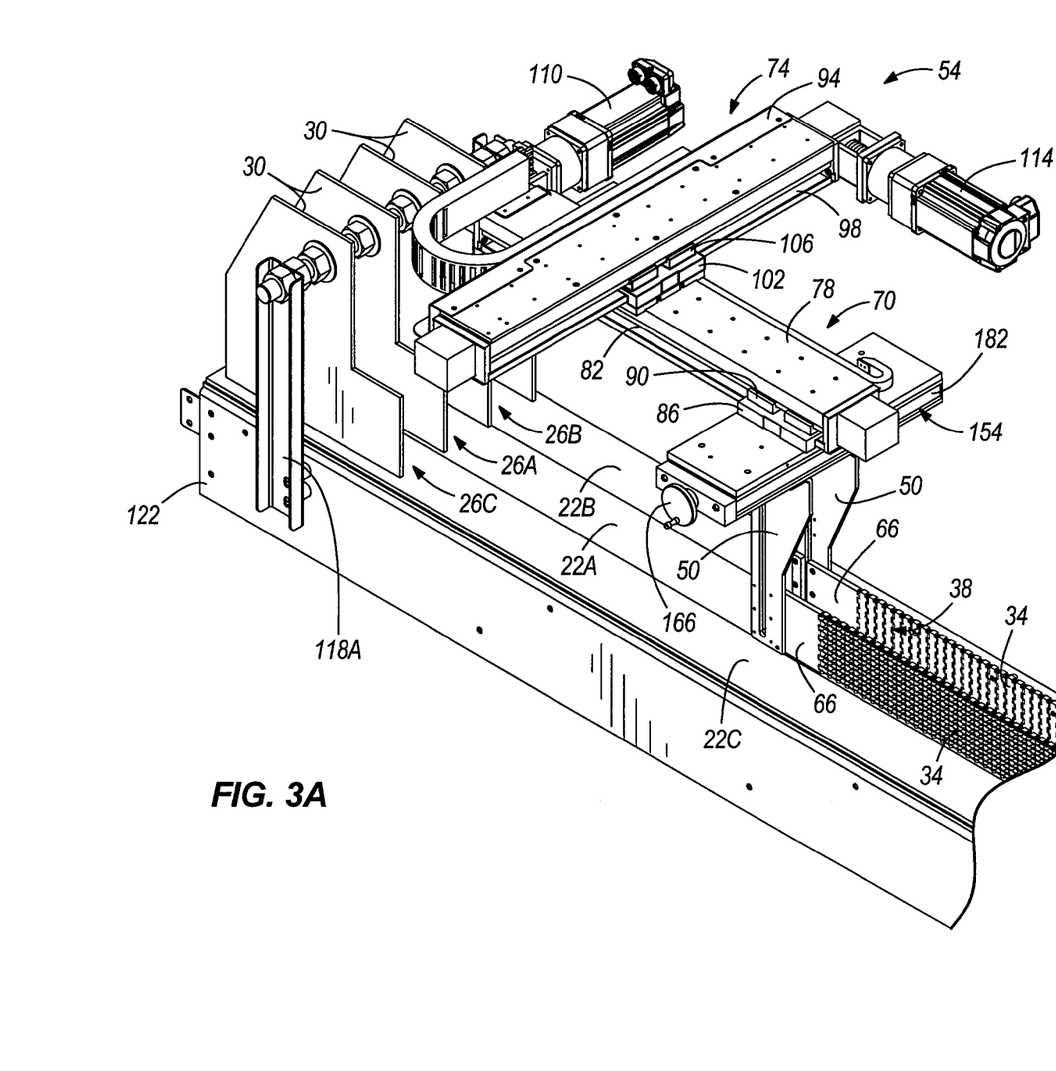
FIG. 3A is an enlarged perspective view of a portion of the conveyor apparatus with the carriage system in a first position.
Figure 3B:
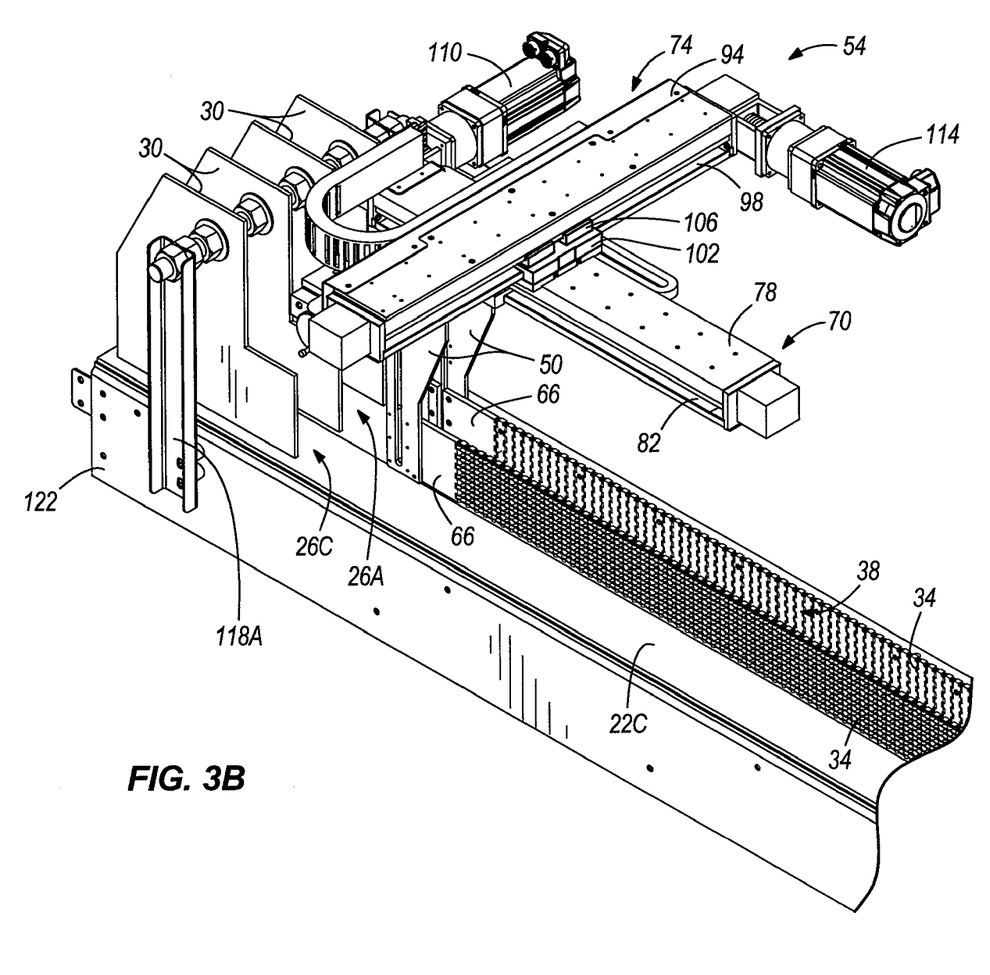
FIG. 3B is an enlarged perspective view of the portion of the conveyor apparatus shown in FIG. 3A with the carriage system in a second position.
Figure 3C:
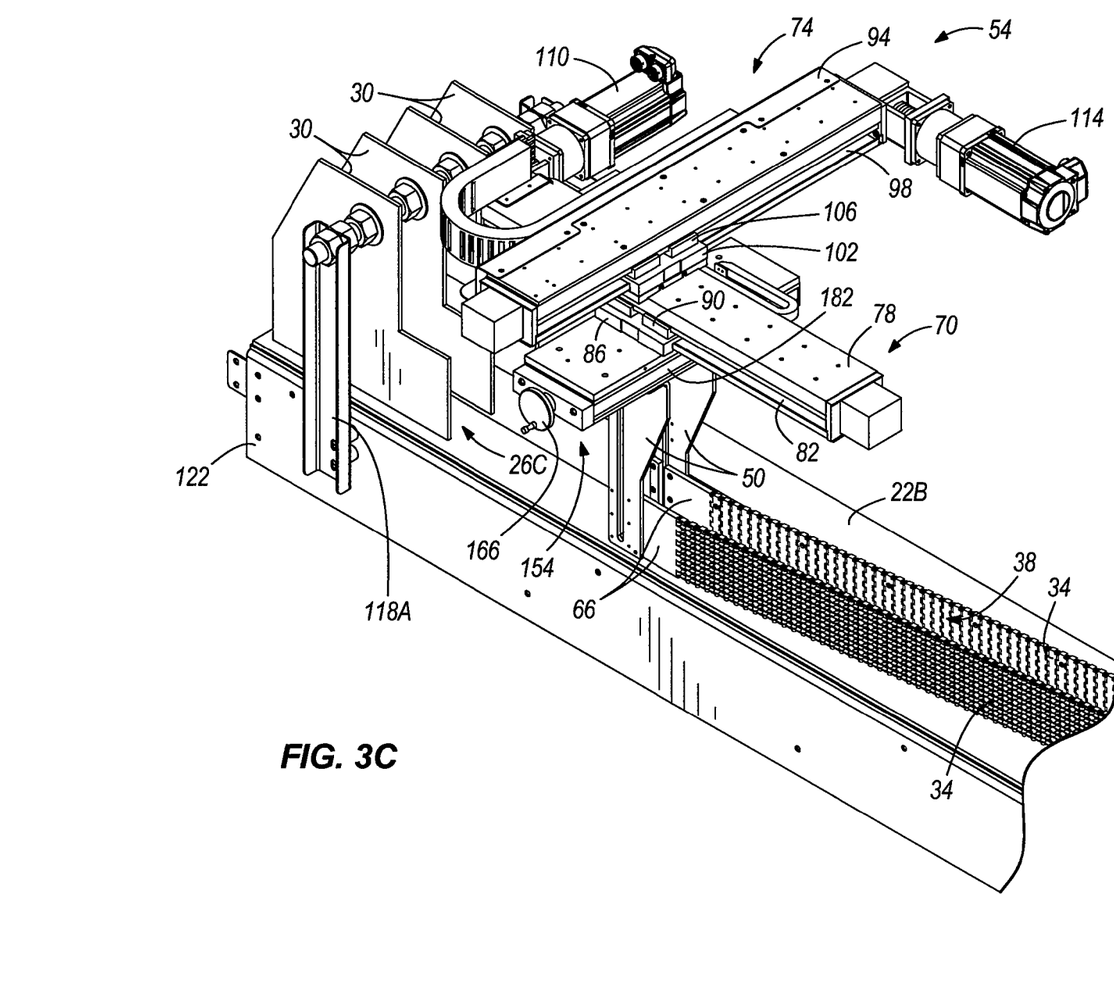
FIG. 3C is an enlarged perspective view of the portion of the conveyor apparatus shown in FIG. 3A with the carriage system in a third position.

Referring to FIGS. 3A-3C, the carriage system 54 includes a linear servo system mounted above the outfeed conveyor 22 to facilitate movement of the guide walls 34 along a length of the outfeed conveyor 22 (i.e., in a first direction generally parallel to a travel direction of articles 42) and across a width of the outfeed conveyor 22 (i.e., in a second direction generally perpendicular to a travel direction of the articles 42). In the illustrated embodiment, the linear servo system is mounted to a frame 62 (FIG. 1) of the conveyor system 14. The downstream portion 34A of each guide wall 34 includes a bracket 66 that is coupled to the yoke member 50, which is coupled to the carriage system 54.

The carriage system 54 includes a first carriage assembly 70 aligned generally parallel to the outfeed conveyor 22 travel path for the conveyed product (i.e., in the first direction) to define a first axis, and a second carriage assembly 74 aligned generally perpendicular to the travel path (i.e., in the second direction) to define a second axis. The first carriage assembly 70 includes a support plate 78, a track 82 coupled to the support plate 78, a mount plate 86 slidably coupled to the track 82 such that the plate 86 slides back and forth along the track 82 in the first direction, and a linear bearing 90 for effecting movement of the plate 86. As shown in FIGS. 3A-3C, the yoke members 50 are coupled to the mount plate 86 such that movement of the mount plate 86 in the first direction translates to linear movement of the guide walls 34 along the outfeed conveyor 22.

The second carriage assembly 74 includes a support plate 94 coupled to the frame 62, a track 98 coupled to the support plate 94, a mount plate 102 slidably coupled to the track 98 such that the plate 102 slides side to side across the outfeed conveyor 22 in the second direction, and a linear bearing 106 for effecting movement of the plate 102. As shown in FIGS. 3A-3C, the mount plate 102 of the second carriage assembly 74 is coupled to the support plate 78 of the first carriage assembly 70 (e.g., by screws of other known fasteners) such that movement of the mount plate 102 in the second direction translates to linear movement of the first carriage assembly 70 and thereby the downstream portion 34A of the guide walls 34 across the outfeed conveyor 22.

Each carriage assembly 70, 74 includes a servo motor 110, 114 and the linear bearing 90, 106 for sliding the mount plates 86, 102 along the respective tracks 82, 98. The servo motors 110, 114 allow for instant speed changes to match upstream or downstream product requirements. Movement of the plates 86, 102, and thereby the guide walls 34, is controlled by a controller (not shown) based upon preset parameters and user commands. The controller commands the carriage assemblies 70, 74 to move the guide walls 34 to specific positions along the outfeed conveyor 22. An example of a linear positioning system used with the carriage assemblies 70, 74 in the diverter system 10 is provided by LinTech (Monrovia, Calif.). It should be readily apparent to those of skill in the art that in further embodiments other systems may be used for moving the guide walls in the first direction and the second direction, such as rodless, pneumatic or electric cylinders, a linear actuator, a gear rack assembly, a ball screw, or other known actuator assemblies.

In FIG. 3A, the first carriage assembly 70 is at a central position on the second carriage assembly 74 and the yoke members 50 are at an upstream, or rearward, position on the first carriage assembly 70. Such a configuration represents a first, or "home", position of the carriage system 54. In FIG. 3B, the carriage system 54 is moved to a second position, whereby the yoke members 50 are at a downstream, or forward, position on the first carriage assembly 70. In FIG. 3C, the carriage system 54 is moved to a third position, whereby the first carriage assembly 70 is at an end of the second carriage assembly 74 such that the guide walls 34 direct the product toward a different channel than when in the first position (FIG. 3A). In addition, the yoke members 50 are at a central position on the first carriage assembly 70.

Referring to FIGS. 1 and 2, the plurality of lane dividers 30 are positioned downstream of the carriage system 54 to define the channels 26A, 26B, 26C. A pair of U-shaped frame members 118A, 118B are coupled to opposite sides of a conveyor bed 122 such that a central portion of each frame member 118A, 118B is spaced above the outfeed conveyor 22. Each divider 30 is coupled to the frame members 118A, 118B and extends downwardly therefrom to define the channels 26A, 26B, 26C. Spacing between the adjacent dividers 30 may be varied depending on the conveyed product size. In the illustrated embodiment, four dividers are shown to define three channels, although fewer or more dividers may be used depending on the number of outfeed lanes and channels for the conveyor system 14.

Figure 4A:
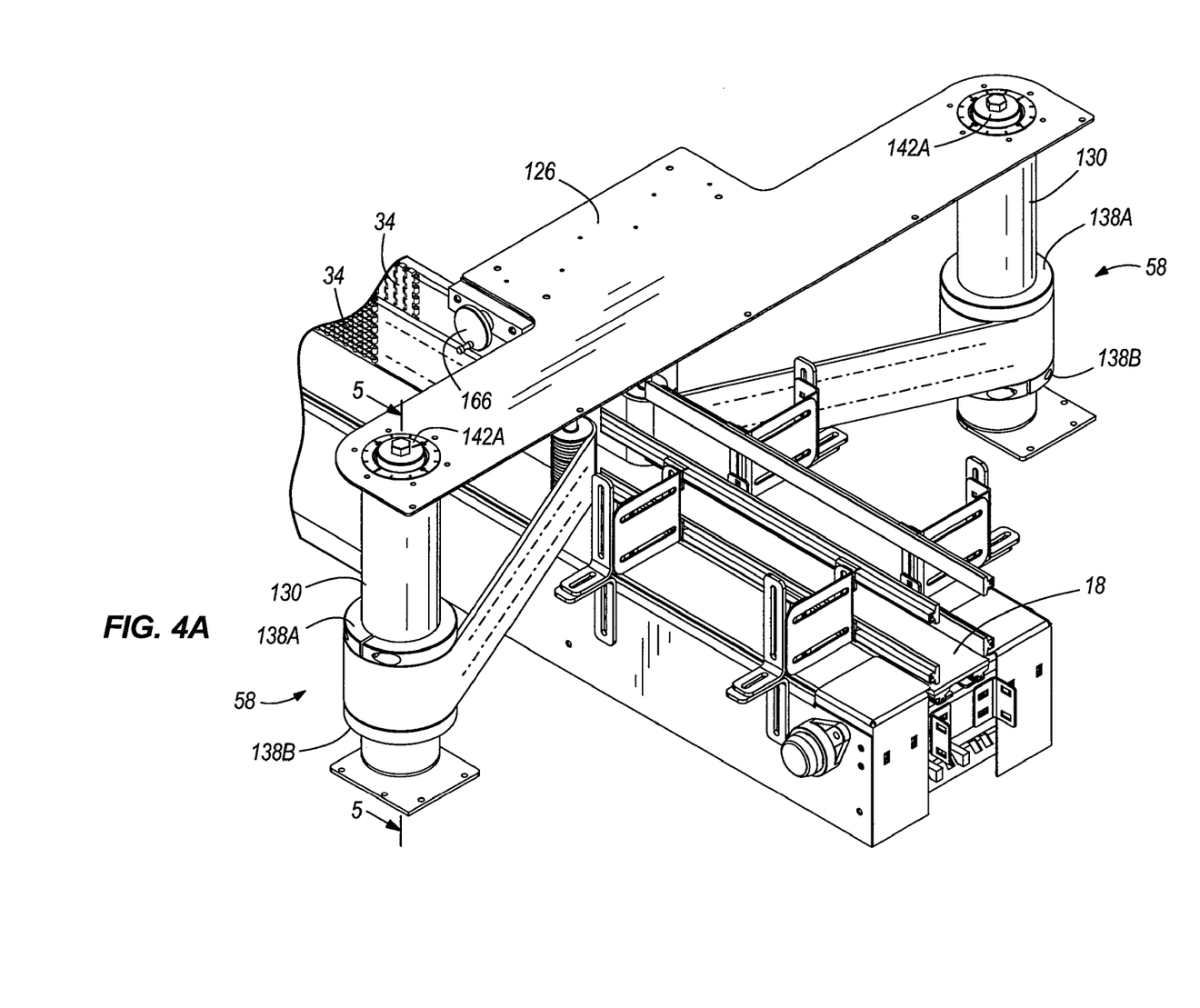
FIG. 4A is a top enlarged perspective view of a portion of the conveyor apparatus including the coil assemblies.

Referring to FIG. 4A, the upstream portion 34B of each guide wall 34 is attached to the respective coil assembly 58, or take-up system. A portion of the wall 34 coils about the coil assembly 58 for storage. A length of each wall 34 is selectively released and taken up by the respective coil assembly 58 during operation of the diverter system 10. In the illustrated embodiment, the coil assemblies 58 are positioned at the interface between the infeed conveyor 18 and the outfeed conveyor 22, and are supported by a plate 126 positioned above the infeed conveyor 18.

Figure 5:
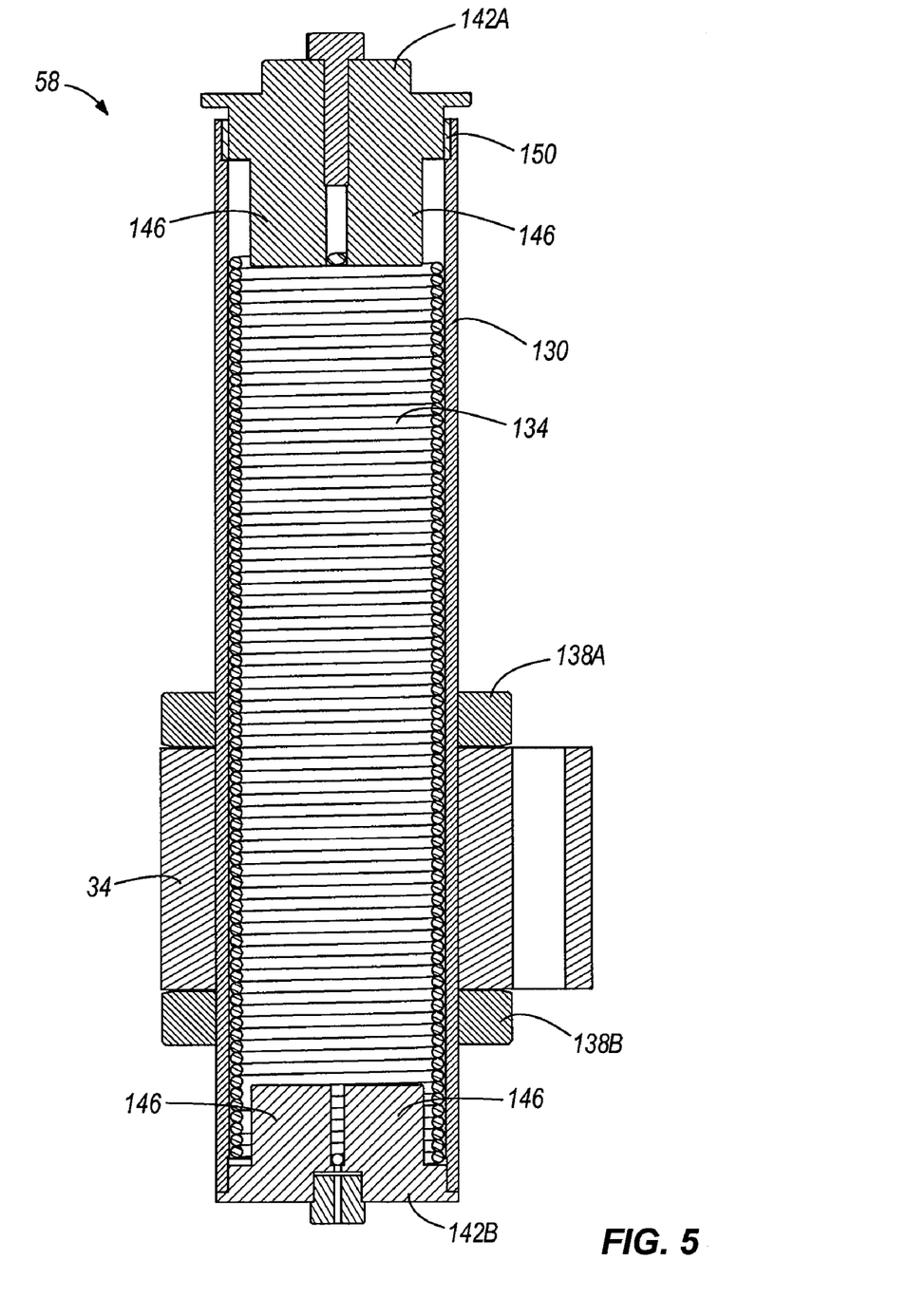
FIG. 5 is a cross-sectional view of one of the coil assemblies take through line 5-5 in FIG. 4A.
Figure 6:
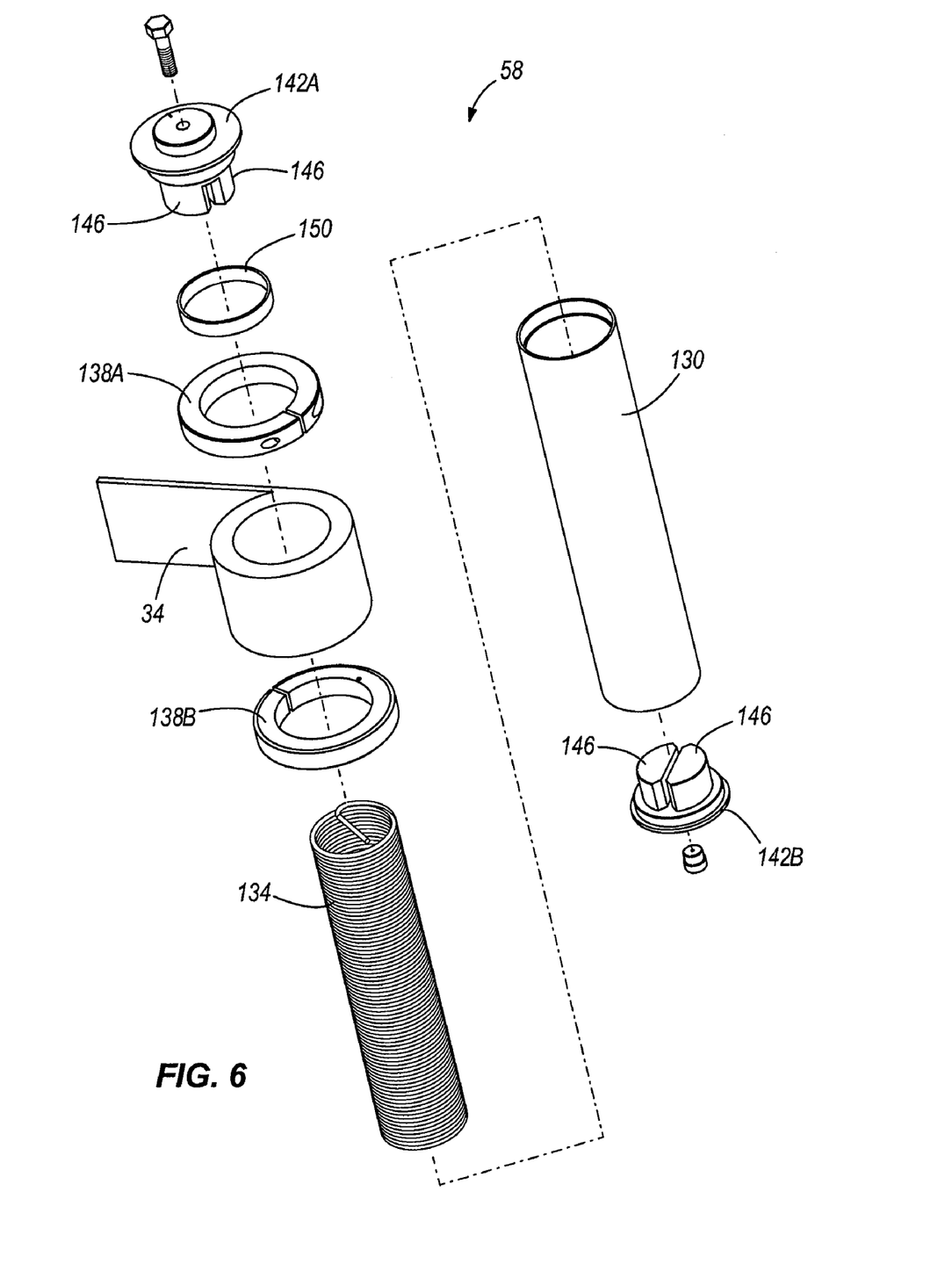
FIG. 6 is an exploded view of the coil assembly shown in FIG. 5.

As shown in FIGS. 5 and 6, each coil assembly 58 includes a spring housing 130, a torsion spring 134, a pair of clamping collars 138A, 138B, and a pair of tensioners 142A, 142B. The guide wall 34 is coupled to the coil assembly 58 between the pair of clamping collars 138A, 138B. The clamping collars 138A, 138B guide or position the guide walls 34 about the housing 130, and are adjustable to accommodate different sized walls or to adjust the height (i.e., distance) of the walls 34 from the infeed conveyor 18 and the outfeed conveyor 22.

The spring housing 130, or bushing, is rotatable relative to the plate 126 to take-up (i.e., coil) the wall 34 about the spring housing 130 and to release (i.e., uncoil) the wall 34 from the coil assembly 58. The torsion spring 134 is contained within the spring housing 130 and is supported between the tensioners 142A, 142B. Each of the tensioners 142A, 142B includes inwardly extending flanges 146 that engage opposite ends of the torsion spring 134. The upper tensioner 142A is exposed through the plate 126 such that a user may turn the tensioner 142A to thereby adjust the tension of the torsion spring 134. A spacer 150 is positioned between the upper tensioner 142A and the spring housing 130 to reduce friction and facilitate relative rotation of the tensioner 142A. In the illustrated embodiment, the torsion spring 134 is biased to a first position, or coiled position, whereby the guide wall 34 is taken up by the coil assembly 58 and coiled about the spring housing 130. However, the torsion spring 134 is rotatable to a second position against the bias of the torsion spring 134 (e.g., when the wall 34 is pulled from the coil assembly 58) such that the spring 134 and the wall 34 are under tension.

In operation, as the carriage system 54 moves the yoke members 50 away from the infeed conveyor 18 in the first direction, the guide wall 34 is pulled from the coil assembly 58, which causes the torsion spring 134 and the spring housing 130 to rotate and release the wall 34. As the carriage system 54 moves the yoke members 50 back toward the infeed conveyor 18, tension is released by the torsion spring 134 and the spring 134 rotates back to the first position. The guide wall 34 then coils about the spring housing 130. In a further embodiment, the guide walls 34 may be moved and positioned by a rotary servo motor, a rotary air cylinder, a rotary actuator, or another known actuator assembly.

In the illustrated embodiment, a first adjustment assembly 154 (FIGS. 3A-3C) is coupled to the downstream portion 34A of the guide walls 34 by the yoke members 50, and a second adjustment assembly 158 (FIG. 4B) is coupled to the upstream portion 34B of the guide walls 34 by roller assemblies 162A, 162B. The adjustment assemblies 154, 158 allow a user to adjust the width of the channel 38 to accommodate different sized products. Typically, both the first and second adjustment assemblies 154, 158 are adjusted such that the width of the channel 38 is the same at both the downstream portion 34A and upstream portion 34B of the guide walls 34. Each adjustment assembly 154, 158 operates in a similar manner and, as such, only the second adjustment assembly 158 will be described in detail herein.

Figure 4B:
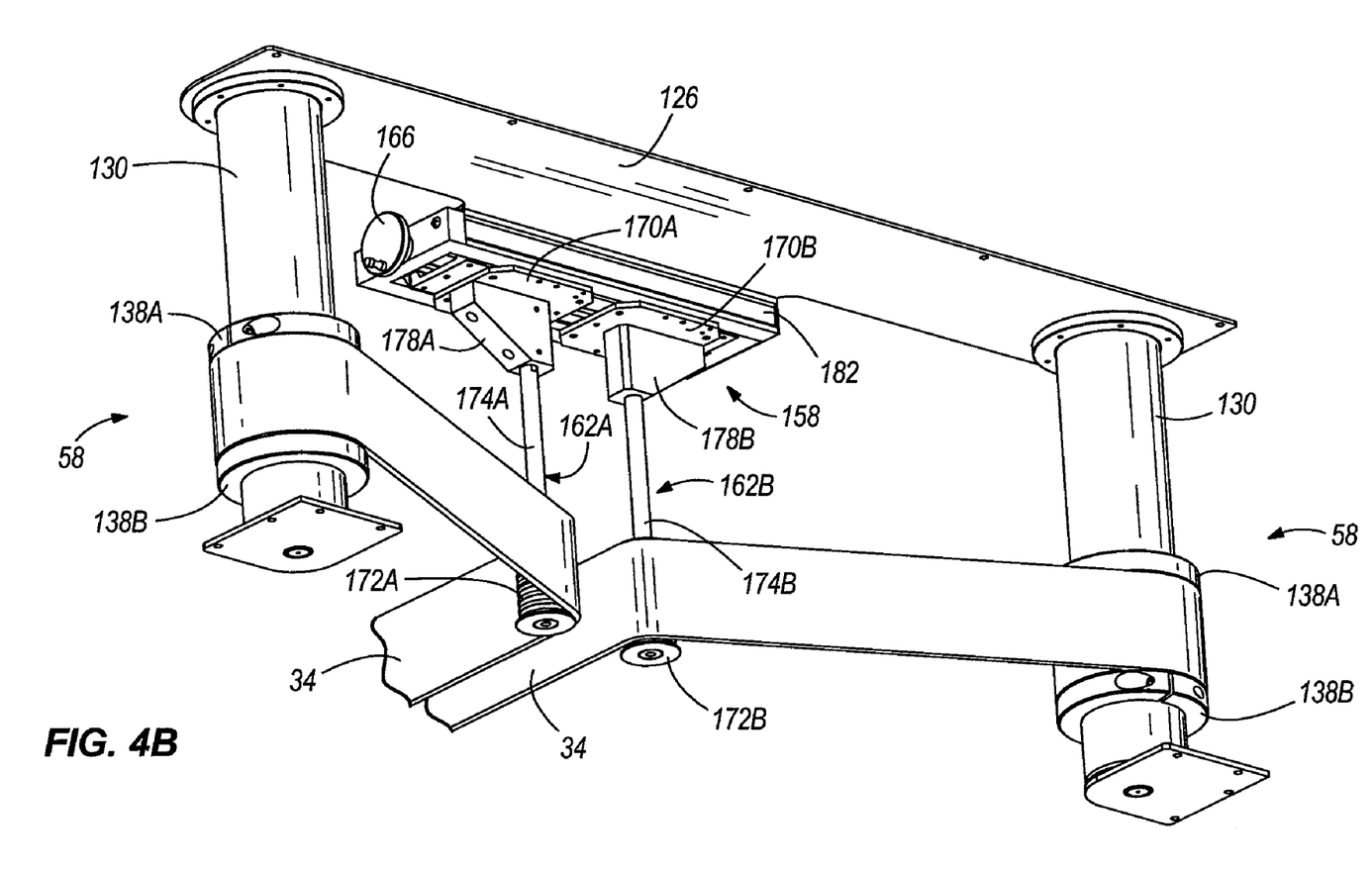
FIG. 4B is a bottom enlarged perspective view of the portion of the conveyor apparatus shown in FIG. 4A.

Referring to FIG. 4B, the adjustment assembly 158 includes a crank handle 166 (FIG. 4A) and first and second dovetail slides 170A, 170B. First and second rollers 172A, 172B of the roller assemblies 162A, 162B are coupled to the slides 170A, 170B through posts 174A, 174B and mount brackets 178A, 178B to engage the guide walls 34 and define the width of the channel 38. In the first adjustment assembly 154, the yoke members 50 are coupled to the slides 170A, 170B directly to engage the guide walls 34 and define the width of the channel 38. The slides 170A, 170B are supported for movement along a track 182 on the plate 126. Rotating the crank handle 166 in one direction (e.g., counterclockwise) causes the slides 170A, 170B, and thereby the rollers 172A, 172B, to separate, increasing the width of the channel 38. Rotating the crank handle 166 in an opposite direction (e.g., clockwise) causes the slides 170A, 170B, and thereby the rollers 172A, 172B, to come together, decreasing the width of the channel 38. In some embodiments, the crank handles 166 of the first and second adjustment assemblies 154, 158 may be coupled such that rotation of one crank handle 166 also causes the other crank handle 166 to rotate. Additionally or alternatively, the adjustment assemblies 154, 158 may be automatically actuated by a servo motor or other suitable device.

In operation, a single file of products enters the diverter system 10 on the infeed conveyor 18, which in the illustrated embodiment aligns with or forms the center, first lane 22A.

When product flows from the infeed conveyor 18 to the first lane 22A, the guide walls 34 are positioned between the first lane 22A and the second lane 22B and between the first lane 22A and the third lane 22C (i.e., the first position), respectively. The product maintains positioning on the first lane 22A for as long as required or desired. In the first position (FIG. 3A), the second carriage assembly 74 is centered about the first carriage assembly 70 and the yoke members 50 are at an upstream position on the first carriage assembly 70 such that a portion of the guide walls 34 is coiled up within the coil assemblies 58. In another embodiment, the guide walls 34 are extended from the coil assemblies 58.

When the first lane 22A has reached capacity or a predetermined value, a sensor signals the controller to move the guide walls 34 to another lane, either the second lane 22B or the third lane 22C. The yoke members 50 are moved to the upstream position on the first carriage assembly 70 (FIG. 3A), if not already located at the upstream position, such that a portion of the guide walls 34 is coiled up within the coil assemblies 58. The yoke members 50 coupled to the mount plate 86 then move away from the infeed conveyor 18 (i.e., forward) along the first carriage assembly 70 to the downstream position (FIG. 3B). Simultaneously, the first carriage assembly 70 moves sideways toward the desired lane along the second carriage assembly 74 (FIG. 3C). The combination of downstream (i.e., forward) movement in the first direction and movement in the second direction by the yoke members 50 aligns the product flow through the channel 38 with a new lane. It should be readily apparent to those of skill in the art that simultaneous movement of the first and second carriage assemblies 70, 74 will result in effective diagonal movement of the guide walls 34 to the desired lane.

During extension and retraction of the guide walls 34, the walls 34 are kept under constant tension between the yoke members 50 and the coil assemblies 58. When the downstream portions 34A of the walls 34 move in the second direction (FIG. 3C), some bowing of the walls 34 may occur to absorb product. In the illustrated embodiment, the walls 34 do not follow a serpentine path. Once the lane alignment is complete, the yoke members 50 move to the upstream position on the first carriage assembly 70, while the first carriage assembly 70 remains stationary, in preparation for a new cycle. The cycle is then repeated depending upon which lane is signaled by the controller.

Movement of the guide walls 34 may also be coordinated based upon sensed gaps between conveyed product on the infeed conveyor 18 or within the outfeed channels 26A, 26B, 26C downstream of the diverter system 10. In one embodiment, if no gap is detected by the sensors, the walls 34 stop during lane change to prevent product from catching between the outfeed channels 26A, 26B, 26C. The walls 34 will move again once the lane change is complete. In one embodiment, the guide walls 34 are mounted such that the walls 34 automatically move in and out of relationship to any product width.

Figure 7:
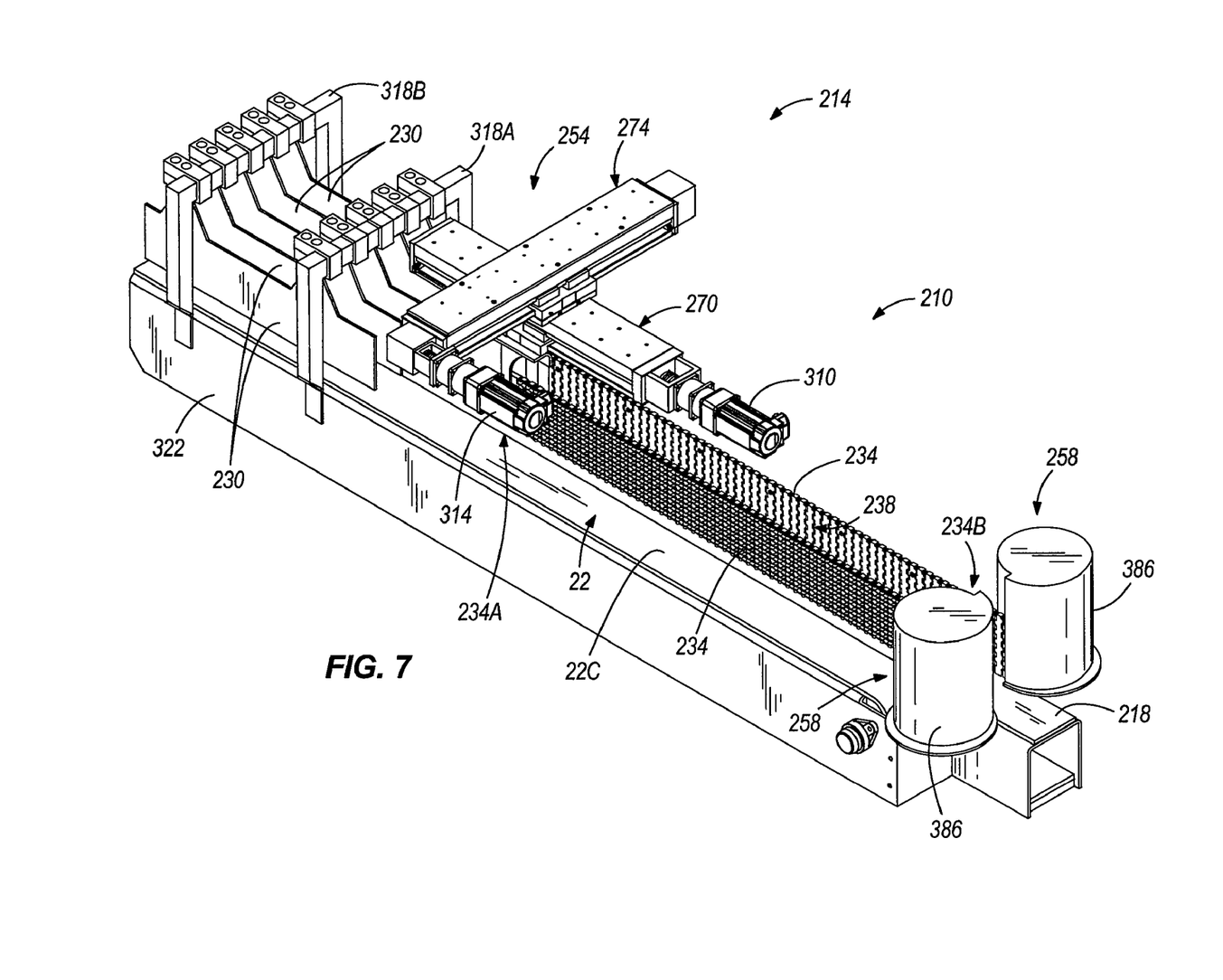
FIG. 7 is a perspective view of a conveyor apparatus according to another embodiment of the invention, the conveyor apparatus including a carriage system and take-up systems.

FIG. 7 illustrates another embodiment of a conveyor apparatus 210, or diverting system, used in a conveying system 214. The diverting system 210 is similar to the diverting system 10 discussed above with reference to FIGS. 1-6 and like parts have been given the same reference number plus 200. Reference is hereby made to the description accompanying FIGS. 1-6 for explanation of the various features and elements of the diverting system 210 not specifically discussed herein.

Figure 8:
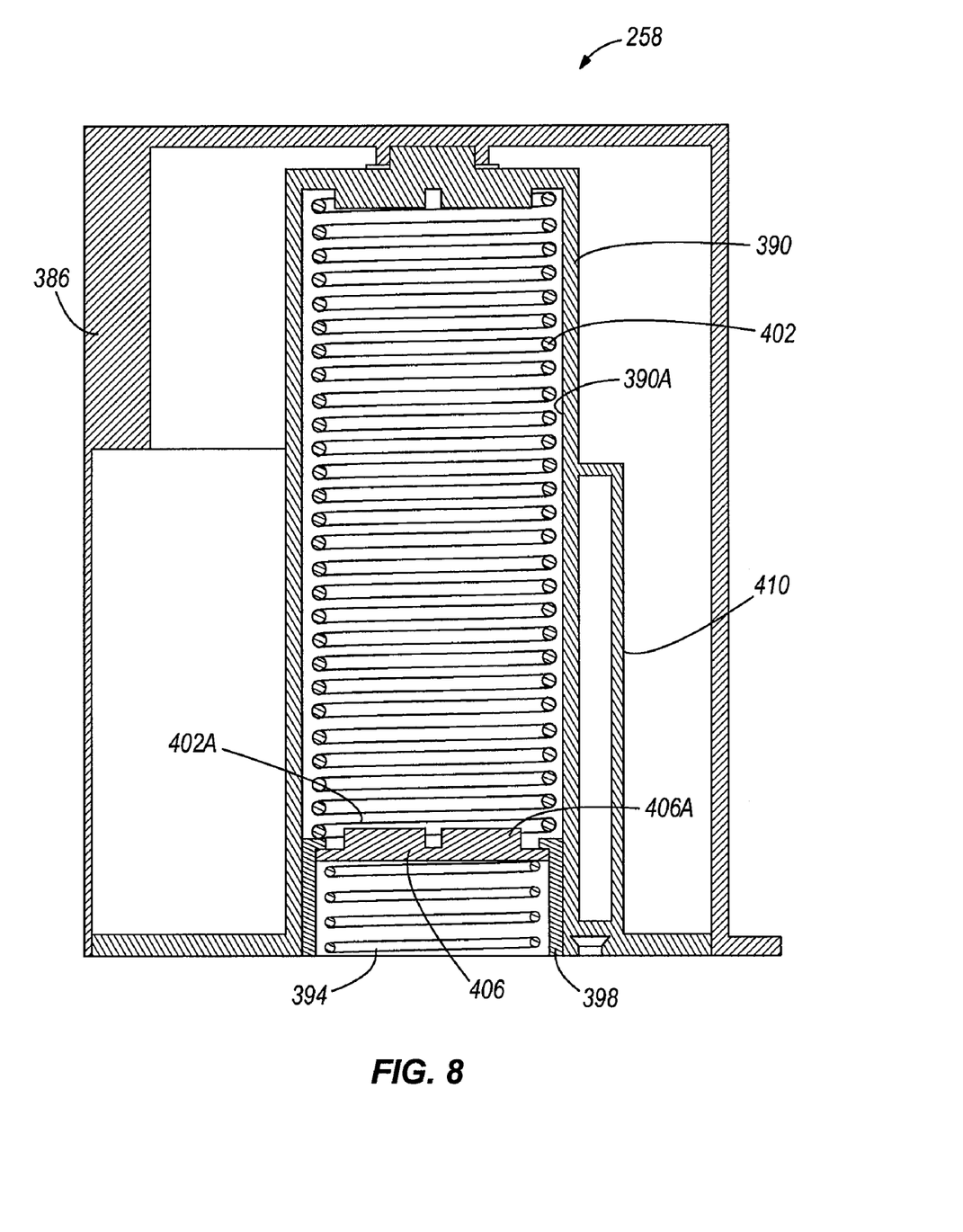
FIG. 8 is a cross-sectional view of one of the take-up systems shown in FIG. 7.

Referring to FIG. 8, each coil assembly 258, or take-up system, includes an outer housing 386, an inner spring housing 390, a compression spring 394, a compression spring housing 398, a torsion spring 402, and a compression spring retainer 406. The inner spring housing 390 is contained within the outer housing 386 and includes an anchor flange 410 extending radially outward from an exterior wall of the spring housing 390. The outer housing 386 includes an opening communicating with an inner chamber of the housing 386. The guide wall 234 enters the opening of the outer housing 386 and is coupled to the anchor flange 410 of the inner spring housing 390 to anchor the wall 234 to the coil assembly 258.

The inner spring housing 390 is rotatable relative to the outer housing 386 to take-up (i.e., coil) the wall 234 about the spring housing 390 and to release (i.e., uncoil) the wall 234 from the coil assembly 258. The torsion spring 402 is contained within an inner chamber 390A of the inner spring housing 390 and is supported by the compression spring housing 398. The compression spring 394 is contained within the compression spring housing 398 and is biased in an upward position against the torsion spring 402. The spring retainer 406 covers the compression spring housing 398 to contain the compression spring 394 within the housing 398. An upper flanged portion 406A of the retainer 406 is coupled to the torsion spring 402 to allow the torsion spring 402 to rotate relative to the compression spring housing 398. A first end 402A of the torsion spring 402 is coupled to the spring retainer 406 and has a smaller diameter than a remaining portion of the torsion spring 402. The first end 402A of the torsion spring 402 fits into an opening of the compression spring housing 398. The compression spring 394 maintains the torsion spring 402 in a centered position as the spring 402 rotates.

Similar to the coil assembly 58 discussed above with reference to FIGS. 5 and 6, the torsion spring 402 is biased to a first position, or coiled position, whereby the guide wall 234 is taken up within the coil assembly 258 and coiled about the inner spring housing 390. The torsion spring 402 is also rotatable to a second position against the bias of the spring 402 such that the spring 402 and the wall 234 are under tension. As the carriage system 254 moves the yoke members back toward the infeed conveyor 218, tension is released by the torsion spring 402 and the spring 402 rotates back to the first position. The guide wall 234 then coils about the inner spring housing 390.

Although particular embodiments of the present invention have been shown and described, other alternative embodiments will be apparent to those skilled in the art and are within the intended scope of the present invention. The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention.

Various features and advantages are set forth in the following claims.

The invention claimed is:

1. A conveyor apparatus for diverting product from a single lane to one of a plurality of lanes, the conveyor apparatus comprising:

a wall having an upstream portion positioned proximate the single lane and a downstream portion positioned proximate the plurality of lanes, the upstream portion stationary relative to the single lane and the downstream portion configured to be movable relative to the plurality of lanes; and a take-up system coupled to the wall for varying a length of the wall in response to movement of the downstream portion.

2. The conveyor apparatus of claim 1, wherein the downstream portion of the wall is configured to move in a first direction and in a second direction relative to the plurality of lanes, the first direction being non-parallel to the second direction.

3. The conveyor apparatus of claim 2, wherein the first direction is substantially parallel to the plurality of lanes and the second direction is substantially perpendicular to the plurality of lanes.

4. The conveyor apparatus of claim 1, wherein the wall is a first wall, and further comprising a second wall including an upstream portion positioned proximate the single lane and a downstream portion positioned proximate the plurality of lanes, the upstream portion of the second wall stationary relative to the single lane and the downstream portion of the second wall configured to be movable relative to the plurality of lanes, and further wherein a length of the second wall is configured to vary in response to movement of the downstream portion of the second wall.

5. The conveyor apparatus of claim 4, wherein the first wall and the second wall define a channel therebetween, and wherein the channel directs the product from the single lane toward the plurality of lanes.

6. The conveyor apparatus of claim 1, further comprising a carriage system coupled to the downstream portion of the wall, the carriage system configured to move the downstream portion of the wall relative to the plurality of lanes.

7. The conveyor apparatus of claim 1, wherein the take-up system comprises: a housing, a collar positioned on the housing to guide the wall about the housing, a torsion spring positioned within the housing to rotate the housing and take-up a portion of the wall, and a tensioner coupled to the torsion spring to facilitate tension adjustment of the torsion spring.

8. A conveyor apparatus for diverting product from a single lane to one of a plurality of lanes, the conveyor apparatus comprising:

a wall having an upstream portion positioned proximate the single lane and a downstream portion positioned proximate the plurality of lanes, the upstream portion stationary relative to the single lane and the downstream portion configured to be movable relative to the plurality of lanes, wherein a length of the wall is configured to vary in response to movement of the downstream portion; and a take-up system coupled to the wall, the take-up system configured to facilitate varying the length of the wall by releasing and taking up a portion of the wall in response to movement of the downstream portion, wherein the take-up system comprises: a housing, a collar positioned on the housing to guide the wall about the housing, a torsion spring positioned within the housing to rotate the housing and take-up a portion of the wall, and a tensioner coupled to the torsion spring to facilitate tension adjustment of the torsion spring.

9. A conveyor apparatus for diverting product from a single lane to one of a plurality of lanes, wherein the product in the single lane is moving on a conveyor along a travel path, the conveyor apparatus comprising:

a wall provided above the conveyor, the wall having an upstream portion and a downstream portion; wherein the downstream portion is configured to be movable in a direction substantially parallel to the travel path and is configured to be selectively movable in a non-parallel direction to the travel path in order to selectively direct the product to one of the plurality of lanes; and a take-up system that varies a length of the wall between the upstream portion and the downstream portion by selectively taking up and releasing a portion of the wall.

10. The conveyor apparatus of claim 9, wherein the upstream portion is stationary relative to the single lane.

11. The conveyor apparatus of claim 9, wherein the wall is a first wall, and further comprising: a second wall provided above the conveyor, the second wall having an upstream portion and a downstream portion, the first wall and the second wall defining a channel therebetween to direct the product, wherein the downstream portion of the second wall is movable with the first wall to selectively vary a length of the channel.

12. The conveyor apparatus of claim 9, further comprising a carriage system coupled to the downstream portion of the wall, the carriage system configured to move the downstream portion of the wall in the direction substantially parallel to the travel path and in the non-parallel direction to the travel path.

13. The conveyor apparatus of claim 9, wherein the take-up system comprises a coil assembly coupled to the wall.

14. The conveyor apparatus of claim 13, wherein the coil assembly further comprises: a housing, a collar positioned on the housing to guide the wall about the housing, a torsion spring positioned within the housing to rotate the housing and take-up a portion of the wall, and a tensioner coupled to the torsion spring to facilitate tension adjustment of the torsion spring.

15. A conveyor apparatus for diverting product from a single lane to one of a plurality of lanes, the conveyor apparatus comprising:

a wall having an upstream portion positioned proximate the single lane and a downstream portion positioned proximate the plurality of lanes, the wall configured to direct the product from the single lane toward the plurality of lanes;

a carriage system configured to move relative to the plurality of lanes in a first direction and in a second direction non-parallel to the first direction, the downstream portion of the wall coupled to the carriage system for movement therewith, wherein the carriage system moves the downstream portion of the wall adjacent to one of the plurality of lanes to direct the product toward the one of the plurality of lanes; and a take-up system coupled to the wall and configured to take-up and release a portion of the wall in response to movement of the downstream portion of the wall.

16. The conveyor apparatus of claim 15, wherein the carriage system further comprises: a yoke coupled to the downstream portion of the wall, a first carriage assembly coupled to the yoke such that the yoke is movable in the first direction along the first carriage assembly, and a second carriage assembly coupled to the first carriage assembly such that the first carriage assembly is movable in the second direction along the second carriage assembly.

17. The conveyor apparatus of claim 15, wherein the take-up system includes a torsion spring rotatable between a first position and a second position, and wherein the take-up system takes-up a portion of the wall as the torsion spring rotates to the first position and releases a portion of the wall as the torsion spring rotates to the second position.

18. The conveyor apparatus of claim 17, wherein the torsion spring is biased to rotate toward the first position.

19. The conveyor apparatus of claim 15, wherein the wall is a first wall, and further comprising a second wall having an upstream portion positioned proximate the single lane and a downstream portion positioned proximate the plurality of lanes, the first wall and the second wall defining a channel therebetween.

20. The conveyor apparatus of claim 19, wherein an adjustment assembly is coupled to at least one of the upstream portions and the downstream portions of the first and second walls to adjust a width of the channel.

21. The conveyor apparatus of claim 20, wherein the at least one adjustment assembly includes a slide coupled to one of the first and second walls and a crank handle operable to move the slide.

22. The conveyor apparatus of claim 15, wherein the take-up system is coupled to the upstream portion of the wall.

23. A conveyor apparatus for diverting product from a single lane to one of a plurality of lanes, the conveyor apparatus comprising:
- a first wall including a first upstream portion positioned proximate the single lane and a first downstream portion positioned proximate the plurality of lanes;
- a second wall generally parallel to the first wall and defining a channel therebetween, the second wall having a second upstream portion positioned proximate the single lane and a second downstream portion positioned proximate the plurality of lanes, the first and second upstream portions stationary relative to the single lane, the first and second downstream portions movable relative to the plurality of lanes and the first;
- a carriage system including a yoke configured to be movable relative to the plurality of lanes in a first direction and a second direction non-parallel to the first direction, the first downstream portion and the second downstream portion coupled to the yoke for movement therewith;
- a first take-up system coupled to the first wall and configured to take-up and release a portion of the first wall in response to movement of the yoke; and
- a second take-up system coupled to the second wall and configured to take-up and release a portion of the second wall in response to movement of the yoke.

24. The conveyor apparatus of claim 23, wherein the carriage system further comprises: a first carriage assembly aligned generally parallel to the plurality of lanes, the yoke coupled to the first carriage assembly for movement in the first direction, and a second carriage assembly aligned generally perpendicular to the plurality of lanes, the first carriage assembly coupled to the second carriage assembly for movement in the second direction.

25. The conveyor apparatus of claim 23, wherein each take-up system includes a torsion spring rotatable between a first position and a second position, and wherein a portion of the wall is taken up as the torsion spring rotates to the first position and a portion of the wall is released as the torsion spring rotates to the second position.

26. The conveyor apparatus of claim 23, wherein the first direction is substantially parallel to the single lane and wherein the second direction is substantially perpendicular to the first direction.

27. The conveyor apparatus of claim 23, wherein the channel has a width, and further comprising:
- a first adjustment assembly including a first slide coupled to one of the first upstream portion of the first wall and the second upstream portion of the second wall, and a first crank handle coupled to the first slide to adjust the width of the channel between the first and second upstream portions; and
- a second adjustment assembly including a second slide coupled to one of the first downstream portion of the first wall and the second downstream portion of the second wall, and a second crank handle coupled to the second slide to adjust the width of the channel between the first and second downstream portions.

* * * * *